United States Patent Office 3,200,955
Patented Aug. 17, 1965

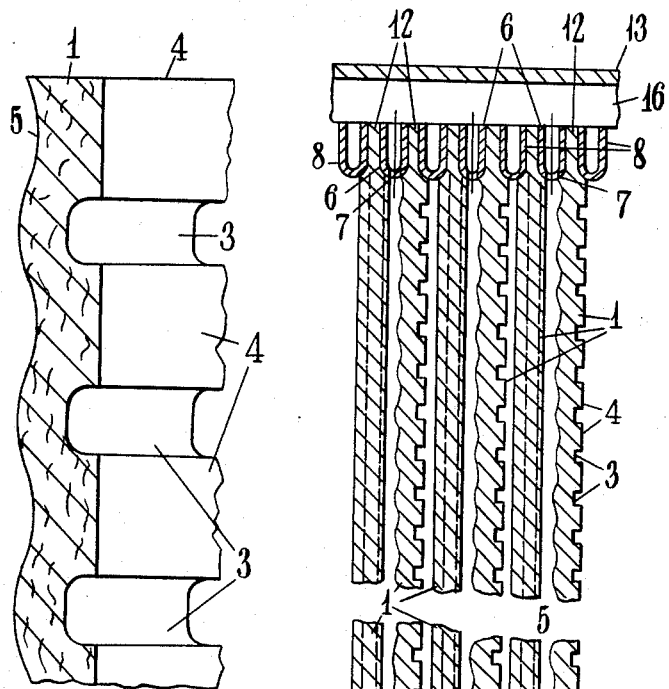
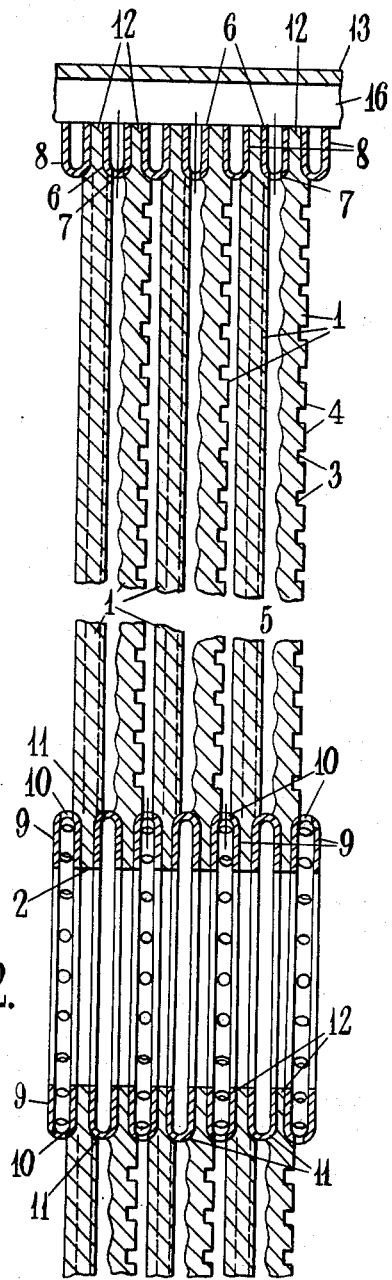
Fig.1.
Fig.2.

3,200,955
FILTRATION APPARATUS FOR FILTERING LIQUIDS
Thomas Claude Worth and Alan George Hobson, both of Cox Green, Maidenhead, England, assignors to British Filters Limited, Maidenhead, Berkshire, England
Filed Feb. 5, 1962, Ser. No. 170,893
Claims priority, application Great Britain, Mar. 15, 1961, 9,527/61
2 Claims. (Cl. 210—492)

This invention relates to filter elements and filtration apparatus for filtering liquids and has for one of its objects to provide an improved form of filter element which is particularly economical to produce and which can be adapted to a wide variety of uses in the filtering of liquids. Another object is to provide an improved filter element assembly or filtration apparatus which is simple and easy to assemble and to operate. The invention can be employed with particular advantage in the filtering of beverage liquids such as beer, but is not restricted to such uses.

The invention consists in a filter sheet or mat formed from fibrous material, with or without the addition of other materials such as diatomaceous earth, and having on at least one face thereof a series of parallel channels separated by ribs extending completely across the face thereof, the mat having sufficient thickness and compressive strength to resist hydraulic pressure caused by filtration but being compressible by mechanical means to eliminate or flatten said channels to form a marginal or other seal.

The invention also consists in a filter sheet or mat according to the preceding paragraph having a channel-like formation on both faces, one of said formations being of corrugated or wave-like shape. In a preferred form of the invention the mat is formed by depositing a fibrous pulp on a wire, as for example in a Fourdrinier or other machine, the wire being shaped to form the channels, and ribs and such formation resulting in a corrugated or wave-like formation of the upper surface of the material on the wire.

The invention also consists in an assemblage of filter mats according to either of the two preceding paragraphs disposed in pairs with their channelled faces adjacent and relatively inclined, preferably at right angles, means being provided for the inlet and outlet of liquid to and from adjacent surfaces of the pairs of mats and for enabling the assemblage of mats to be compressed in a direction at right angles to their faces to provide marginal or other seals. In a convenient arrangement according to the invention sealing members of metal or other relatively rigid material are interposed between individual mats, alternate members being apertured to provide for inflow and outflow of the liquid for filtration. In a preferred construction the sealing members are of U-shape in cross section. The sealing members may be formed from resilient material if desired.

The invention also consists in an assemblage of filter elements or mats, according to any of the three preceding paragraphs, enclosed within a container including means for maintaining the elements or mats in a previously compressed condition to form a seal.

In a preferred form of the invention as applied to mats of circular shape having a central circular aperture, the sealing members consist of hollow rings U-shape in cross section. Mechanical pressure is applied to the assembled mats and sealing members or rings to compress the portions of mat lying between the rings, sufficiently to form seals at the outer and inner peripheries. The pairs of mats are assembled in a pack so that adjacent mat surfaces through the pack are identical and constitute either inlet or outlet surfaces, the relative inclination, preferably a right angle of the channels or corrugations affording the whole of the effective area of the mat access by way of said channels or corrugations to either the inlet or outlet apertures.

There is an advantage in having a simple form of channelling, e.g. corrugations, on the inlet faces of the mats, as during back-washing of the filter the corrugations afford support and allow debris to escape from the mat surface by way of the filter inlet.

In the drawings accompanying this specification:

FIGURE 1 is a perspective view of part of a filter sheet or mat made in accordance with one form of the invention;

FIGURE 2 is a vertical section through part of an assemblage of circular filter mats constructed in accordance with one form of the invention, the mats being shown previous to full compression thereof;

Figure 3:
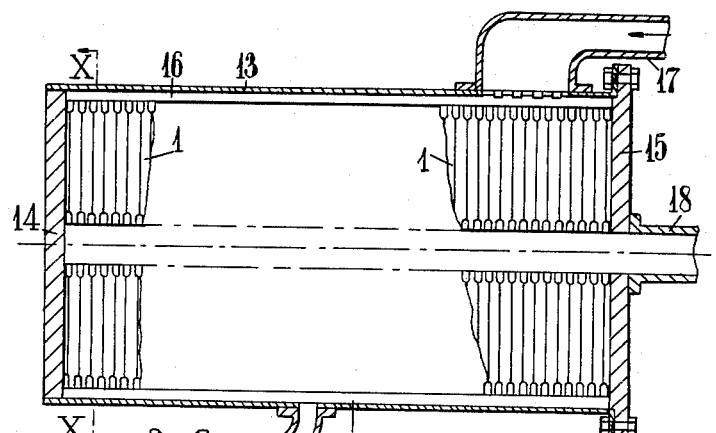
FIGURE 3 is a vertical section, more or less diagrammatic, of a filtration apparatus incorporating an assemblage of compressed filter elements or mats in accordance with one form of the invention.

In carrying the invention into effect according to one convenient mode, described by way of example with reference to FIGURES 1, 2 and 3, there is provided an assemblage of circular filter mats 1 each having a circular central hole as indicated at 2 in FIGURE 2. The mats are formed from fibrous material which may be of the composition described in British Patent No. 764,911 but preferably includes a filling of diatomaceous or other earth as described in British Patent No. 820,826. Each mat is formed on one face thereof with a series of parallel channels 3 of generally rectangular cross section separated by rib formations 4 which are wider than the channels, the ribs and channels being continuous over the whole of the face area. The opposite face of each mat has a wave-like or corrugated contour as seen in FIGURE 1, the crests of the waves lying parallel to the channels 3. This formation of the two faces of the mats is conveniently achieved by forming either a continuous strip or ribbon as on a Fourdrinier machine, or separate sheets of the fibrous material on a suitable machine in which the wire upon which a fibrous pulp mixture is deposited is shaped to form the channels 3 and ribs 4. In the formation of these ribs and channels upon the wire, the upper surface of the fibrous mixture necessarily assumes a corrugated or wave-like form as shown in FIGURES 1 and 2, the advantage of which will appear later. The mats are formed or cut to the desired size from the strip or ribbon. The composition and thickness of the mats is such that the ribbed parts thereof have sufficient compressive strength to resist hydraulic pressure differences across them during filtration when the mats are assembled in a pack, but at the same time are capable of being compressed at their edges under considerably higher mechanical pressure to form a seal in the same manner as with known fibrous filter mats. If necessary the mats are impregnated with a stiffening agent, e.g. a synthetic resin to provide the desired compressive strength under filtration conditions as described in British Patent No. 764,911. The mats are thus self-supporting and do not require rigid supporting plates as in the conventional filter press.

The mats are assembled as shown in FIGURE 2 between outer and inner hollow rings of U-shaped cross section, alternate rings being apertured for the inflow and outflow of liquid. The outer rings 6 are formed at inner edges with a circumferentially spaced series of feed holes 7, the alternate rings 8 being imperforate. Likewise the inner rings 9 have a series of feed holes 10 and the alternate rings 11 are imperforate. Each of the outer imperforate rings 8 lies opposite an inner perforated ring 9. The mats are assembled in pairs so that the surfaces having the channels 3 are adjacent with the ribs and channels disposed at right angles and constitute the outlet surfaces. The corrugated surfaces of the mats are also disposed adjacent with their corrugations lying at right angles and constitute the inlet surfaces. It will be seen that these pairs of mats are arranged so that adjacent surfaces through the pack are identical and are either outlet or inlet surfaces. It is to be understood that the mats are shown in FIGURE 2 in a partially compressed condition. Mechanical pressure is then applied to the assemblage so that the portions marked 12 between the sealing rings are compressed sufficiently to form seals and also so that the channeled and corrugated surfaces respectively are brought substantially into contact at the crossing points of the ribs 4 and the crest of the corrugations 5. The arrangement is such that liquid to be filtered enters the apertured outer rings 6 in the direction of the arrows and after flowing between the corrugated surfaces 5 of each pair of mats the liquid passes through the thickness of the adjacent mats to the channels 3 between the outlet faces from which it flows inwardly through the apertures 10 of the inner rings 9 and thence to discharge. It will be seen that by the arrangement of the channels 3 and ribs 4 at right angles in each pair of mats the whole effective area of each mat is afforded access by way of the channels to the centre outlet, and similarly in regard to the inlet.

Figure 4:
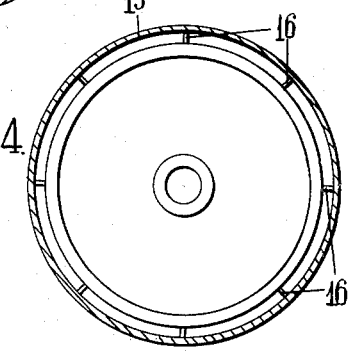
FIGURE 4 is a cross section taken on the line X—X of FIGURE 3.

FIGURES 3 and 4 show the assembled and compressed mats and sealing rings mounted in a cylindrical casing 13 having end plates 14 and 15. Spacing ribs 16 attached to the interior of casing 13 maintain the assembled mats centrally and in alignment. The mats are compressed within the casing by the use of a hydraulic ram or other compression device and the end plate 15 is then bolted in position to maintain the compression. The casing 13 is provided with an inlet connection 17 leading to the annular space surrounding the outer sealing rings of the mat assembly, and the end plate 15 has a central outlet 18 aligned with the inner sealing rings. A drain connection 19 and valve 20 are preferably provided.

Figure 5:
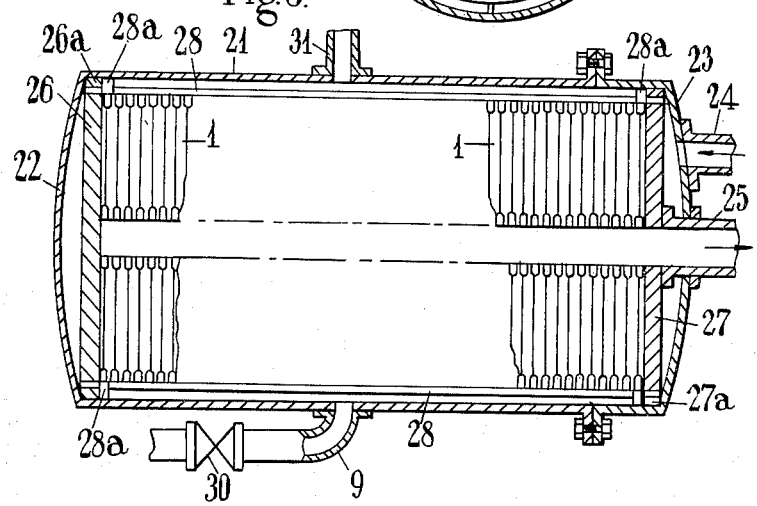
FIGURE 5 is a vertical section more or less diagrammatic, of a modified form of filtration apparatus in accordance with the invention, the mats being indicated in compressed condition.

A modified construction is shown in FIGURE 5 in which the casing 21 has an integral end 22 and a cap 23 carrying inlet and outlet connections 24 and 25. Separate end plates 26 and 27 have peripherally spaced apertured lugs 26a and 27a to receive rods 28, preferably provided with collars 28a, which support the assembled mats in alignment. In this method of construction the element is compressed and assembled before mounting in the casing. End plates 26 and 27 together with mats and rings are compressed, and rods 28 are mounted and pinned at each end. The element is then a completely sealed unit and may be positioned in the casing, the end cap 23 being then bolted on to the casing to complete the assembly. The casing is preferably provided with a drain connection 29 having a valve 30, and with an air vent 31.

In one example of a filter mat in accordance with the invention the composition of the mat is 20% of fibrous material such as cellulose fibres or a mixture of cellulose and asbestos fibres, and 80% of the diatomaceous earth or other earth like substance, these proportions being related to the dry weight. Also the strength of the mat material in compression is such that the channels do not become substantially deformated or flatted under a hydraulic pressure difference during filtration of 30 lbs. per square inch. The mechanical pressure applied for sealing the mats between the rings would be in the neighborhood of 400 lbs. per square inch.

The mats are assembled in a dry condition, and when subsequently wetted in use they lose a considerable amount of their resilience. The corresponding loss in sealing pressure can be largely eliminated by forming the sealing rings, or other sealing members to have inherent resilience so that the sealing pressure is more or less maintained throughout the life of the mat.

The invention is not restricted to the examples described above, since the filter mats may be of any desired shape, the sealing rings being replaced by correspondingly shaped metal margins. Thus for example the mats may be square or rectangular with inlet and outlet apertures formed within the area of the mat, and with sealing margins and aperture sealings rings correspondingly disposed.

In carrying the invention into effect according to another mode, the mats are formed and adapted for use in a filter press of the known kind employing plates between which mats are clamped. Filter mats according to the present invention cannot be compressed sufficiently to afford effective marginal seals in the known kind of filter press, and accordingly the mats are separated by frames provided with peripheral sealing margins of rubber or other resilient material and also furnished with inlet and outlet ports disposed within the area of the mats. With this arrangement the mats are self-supporting and are readily accessible.

It will be understood that by reversing the arrangement of the mats and rings described in the above examples during the assembly thereof, the positions of the inlet and outlet will be reversed. This is advantageous in circumstances where a central filter inlet is desired.

What we claim is:

1. In a filter, the combination of a plurality of rigid filter mats arranged in parallel planes presenting one edge to a source of liquid to be filtered and its other edge to a discharge passage, each mat being formed of a self-supporting layer of fibrous material and having a series of alternately thick and thin portions providing channels of substantially rectangular cross-section separated by rib formations on one side of said mat, the other side of said mat having a wave-like contour parallel to said channels, rigid separating means located at each said edge between adjacent mats, the alternate separating means at the one edge having inlet means having openings therein for passage of the liquid to be filtered, and alternate separating means at the other edge of said mats having outlet openings for passage of filtered liquid, and means pressing said rigid separating means toward one another under heavy pressure in a direction normal to the planes of said mats, whereby the margins of said mats between said rigid separating means are crushed and flattened to provide a sealing effect.

2. The filter of claim 1 in which said mats are arranged so that the ribs and wave-like contours of one mat lie at an angle to the ribs and wave-like contours of any adjacent mat.

References Cited by the Examiner

UNITED STATES PATENTS

| 2,304,618 | 12/42 | Williams | 210—347 |
| 2,537,992 | 1/51 | Gross et al. | 210—493 X |
| 2,675,920 | 4/54 | Muller | 210—492 |
| 2,902,164 | 9/59 | Dornauf | 210—347 X |

FOREIGN PATENTS 480,810  3/38  Great Britain.

REUBEN FRIEDMAN, *Primary Examiner.*

HERBERT L. MARTIN, *Examiner.*